(12) United States Patent
Hrle et al.

(10) Patent No.: US 7,792,839 B2
(45) Date of Patent: Sep. 7, 2010

(54) INCREMENTAL INDEXING OF A DATABASE TABLE IN A DATABASE

(75) Inventors: Namik Hrle, Boeblingen (DE); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 11/271,677

(22) Filed: Nov. 10, 2005

(65) Prior Publication Data
US 2006/0155752 A1 Jul. 13, 2006

(30) Foreign Application Priority Data
Jan. 13, 2005 (EP) ................... 05100168

(51) Int. Cl.
*G06F 7/00* (2006.01)
(52) U.S. Cl. .................... 707/741; 707/808
(58) Field of Classification Search ............. 707/100, 707/102
See application file for complete search history.

(56) References Cited

U.S. PATENT DOCUMENTS

| | | | | |
|---|---|---|---|---|
| 5,204,958 | A * | 4/1993 | Cheng et al. ............ | 707/102 |
| 5,685,003 | A | 11/1997 | Peltonen et al. ......... | 395/793 |
| 5,717,912 | A | 2/1998 | Millett et al. | |
| 5,765,168 | A | 6/1998 | Burrows | |
| 6,026,406 | A * | 2/2000 | Huang et al. ............ | 707/100 |
| 6,070,158 | A | 5/2000 | Kirsch et al. ............ | 707/3 |
| 6,463,439 | B1 * | 10/2002 | Dahlberg ................ | 707/100 |
| 2002/0029212 | A1 * | 3/2002 | Chen et al. ............. | 707/3 |
| 2004/0044659 | A1 * | 3/2004 | Judd et al. ............. | 707/3 |
| 2004/0205046 | A1 * | 10/2004 | Cohen et al. ........... | 707/3 |

FOREIGN PATENT DOCUMENTS

| | | |
|---|---|---|
| EP | 0 522 363 A2 | 1/1993 |
| FR | 2798206 | 7/1999 |
| WO | WO 03/003255 A | 1/2003 |

OTHER PUBLICATIONS

Winter et al., "Using Microsoft Office 95," 1998, Indianapolis, Ind. Que, ISBN 9780789716224, pp. 201-203.*
Pollari-Malmi, et al. "Concurrency Control for B-Trees with Differential Indices", IEEE, 10 pgs, Sep. 2000.
Ramakrishnan, et al. "Mass Collaboration: A Case Study", IEEE, 14 pgs, Jul. 2004.

(Continued)

*Primary Examiner*—Cam Y T Truong
(74) *Attorney, Agent, or Firm*—Kunzler Needham Massey & Thorpe (57) ABSTRACT

The present system indexes a plurality of entries in a database that contains a database table having a base index. As a recent row is inserted in the database table, an index increment is generated based on the inserted row. Preferably, the index increment is smaller in size than the base index because it is recently generated. The smaller size of the index increment facilitates the management of the index increment. An index entry associated with the inserted row is added to the index increment, and the index increment is merged with the base index.

9 Claims, 13 Drawing Sheets

OTHER PUBLICATIONS

Jagadish H.V.; et al; "Incremental organization for data recording and warehousing" Proceedings of the International on Very Large Databases, Aug. 26, 1997, pp. 16-25, XP002260948.

O'Neil P.; Cheng E.; Gawlick D.; O'Neil E.: "The log-structured merge-tree (LSM-tree)" ACTA Informatica, vol. 33, No. 4, 1996, pp. 351-385, XP009122954.

* cited by examiner

INCREMENTAL INDEXING OF A DATABASE TABLE IN A DATABASE

PRIORITY CLAIM

The present application claims the priority of European patent application, Serial No. 05100168.3, titled "Incremental Indexing," which was filed on Jan. 13, 2005, and which is incorporated herein by reference.

FIELD OF THE INVENTION

The present invention generally relates to the field of updating a database, and it particularly relates to managing indexes upon insertion of data rows.

BACKGROUND OF THE INVENTION

Computer databases are a common mechanism for storing information on computer systems while providing easy access to users. A typical database is an organized collection of related information stored as rows having fields of information. As an example, a database of employees may have a row for each employee comprising different columns or fields such as name, department, phone number, salary, etc. Rows are organized in a table, a two-dimensional structure with rows indicating the rows having fields of information and columns indicating the fields.

To speed up access to the data of the database table, rows can be indexed and the index entered into a base index. For example, one index can indicate where to find the rows containing a particular name, another index can indicate where to find the rows containing specific departments.

To allow for complete responses to queries, each time the database is updated by inserting a new row, the index or indexes are also updated; i.e., a corresponding entry is inserted in the index.

Rows and indexes are physically stored on storage media such as tape or disk. When taking any action on the database such as processing a query, inserting a new row, indexing a new row, etc., the corresponding data is retrieved from the storage medium into a cache. The database management system performs actions on the data while the data is in the cache.

In large databases, the index is also large. Consequently, new entries are time consuming. This is particularly a problem if the index is larger than the cache such that many storage medium reads are necessary for updating the index.

What is therefore needed is a system, a computer program product, and a method for indexing incrementally to enhance the inserting performance of a database. The need for this solution has heretofore remained unsatisfied.

SUMMARY OF THE INVENTION

The present invention satisfies this need, and presents a system, a computer program product, and an associated method (collectively referred to herein as "the system" or "the present system") for incremental indexing upon insertion of data rows in a database.

According to a preferred embodiment of the present invention, a database management system manages a database that stores a database table containing data pages. Each data page is capable of storing data rows. The data rows store information organized into particular columns. The database table has a base index for logically ordering the data rows. The base index comprises index entries wherein each data row is referenced by a corresponding index entry. The present system comprises a method for indexing the database comprises inserting a row, generating an index increment, making an index entry associated with the row into the index increment, and merging the index increment with the base index.

If the database is updated by inserting a new row, the indexing is performed immediately, to provide correct access to all information. However, the present system does not perform the indexing in the base index. Rather, the present system generates an index increment and performs the corresponding index entry in the index increment instead of the base index. The present system merges the index increment with the base index.

The index increment is typically smaller than the base index because it is newly generated. The small size of the index increment facilitates management of the index increment. The place at which to enter the new index entry is found much faster than when searching the entire base index for an entry place. The merger of the index increment and base index can be timed such that the performance of the database management system is not impeded by the merger. If a query is submitted before the index increment and base index have been merged, the incremental index and the base index are scanned. Consequently, correct access to information is provided.

When more than one row is inserted, index entries concerning the rows are made into the index increment and the merging is performed after rows have been inserted and indexed. In cases where a plurality of rows is inserted, the gain in speed by indexing into an index increment instead of the base index is especially high.

Furthermore, the present system can insert more than one row and generate more than one index increment. This is especially convenient if large amounts of rows are inserted that would otherwise lead to too large an index increment, thus leading again to a decrease in speed of the indexing.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 2 comprises FIGS. 2A and 2B and schematically illustrates conventional indexing;

FIG. 4 comprises FIGS. 4A, 4B, 4C, and 4D and schematically illustrates a database management system according to the present invention;

DETAILED DESCRIPTION OF PREFERRED EMBODIMENTS

Figure 1:
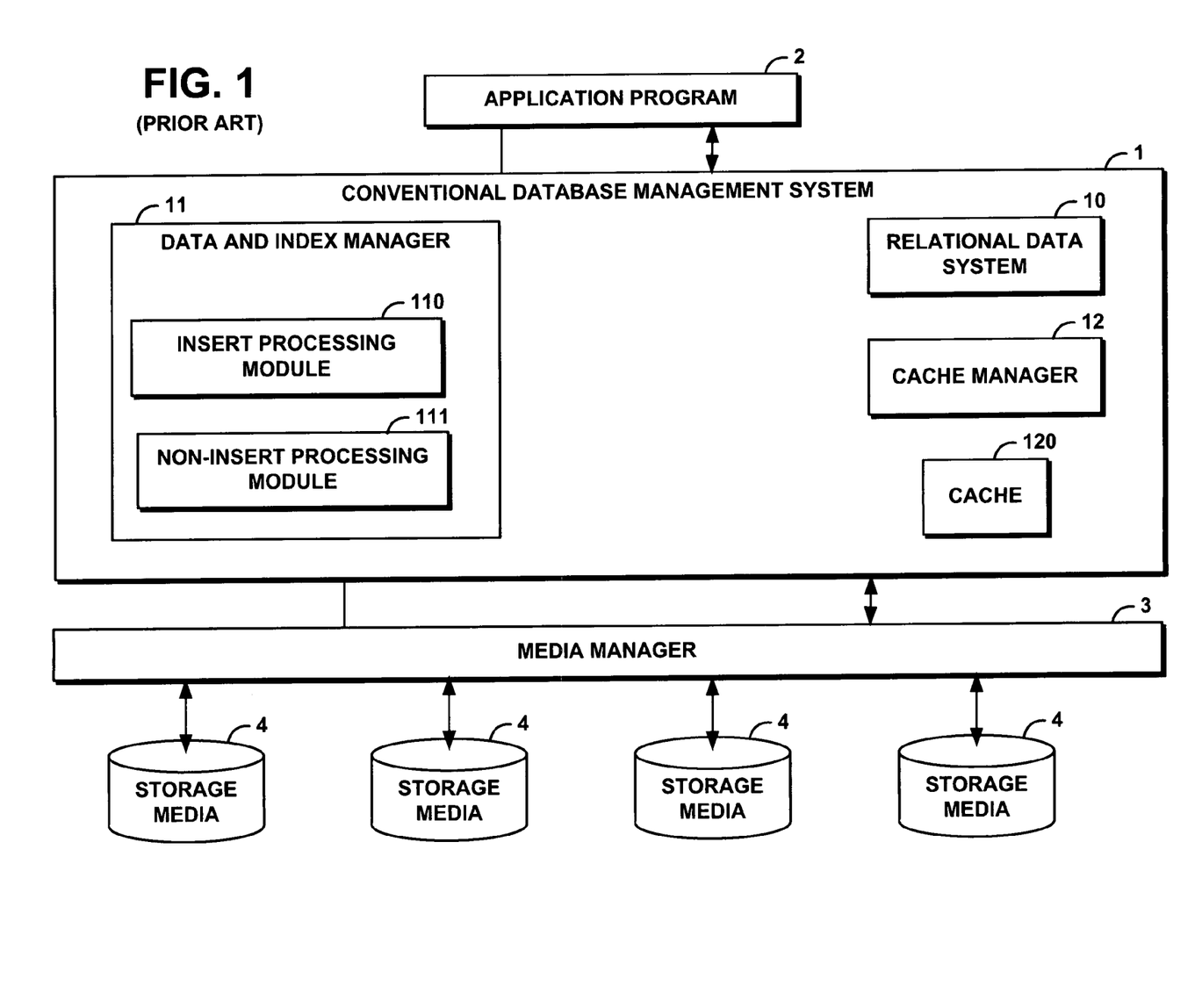
FIG. 1 schematically illustrates a conventional database management system.

FIG. 1 illustrates schematically a conventional database management system 1. The conventional database management system 1 may be implemented, for example, as computer with an appropriate computer program product running on it. The computer may be a stand-alone device or be a member of a network with servers and clients.

The conventional database management system 1 comprises a relational data system 10, a data and index manager 11, and a cache manager 12. The conventional database management system 1 interacts with an application program 2 or interactive user that generates database requests such as, for example, SQL statements. These SQL statements may be, for example, "insert" or "non-insert" statements, such as "read", "select", "delete", etc. and result in retrieval or modifications of the stored data. The database requests such as SQL statements are processed by various components, such as the relational data system 10, the data and index manager 11, or the cache manager 12 and result in retrieval or modification of the data stored in a storage media subsystem such as a media manager 3 or storage media 4.

In particular, the database requests are processed by an insert-processing module 110 for insert requests and by a non-insert processing module 111 for non-insert requests. The insert processing module 110 and the non-insert processing module 111 are components of the data and index manager 11. In response to the database requests, e.g. SQL statements from the application program 2, the conventional database management system 1 returns information on rows of a database table and status information. The conventional database management system 1 may also receive information on rows to add.

Data such as the content of a database table and a base index is stored on the storage media 4. The storage media 4 comprises media such as, for example, disks or tapes. To store and retrieve data, the conventional database management system 1 uses the cache manager 12. The cache manager 12 manages the cache 120. The cache 120 is, for example, arranged as buffer pools. The cache manager 12 communicates with the media manager 3 by sending read or write pages requests and by receiving data and index pages. Pages (further referenced herein as blocks or physical blocks) are entities corresponding to the physical blocks of the storage media containing the data of the database. The media manager 3 provides pages by communicating with the storage media 4 via I/O programs addressing the physical blocks.

The relational data system 10 is arranged to perform tasks such as parsing, optimizing, predicate evaluation etc.

Figure 2A:
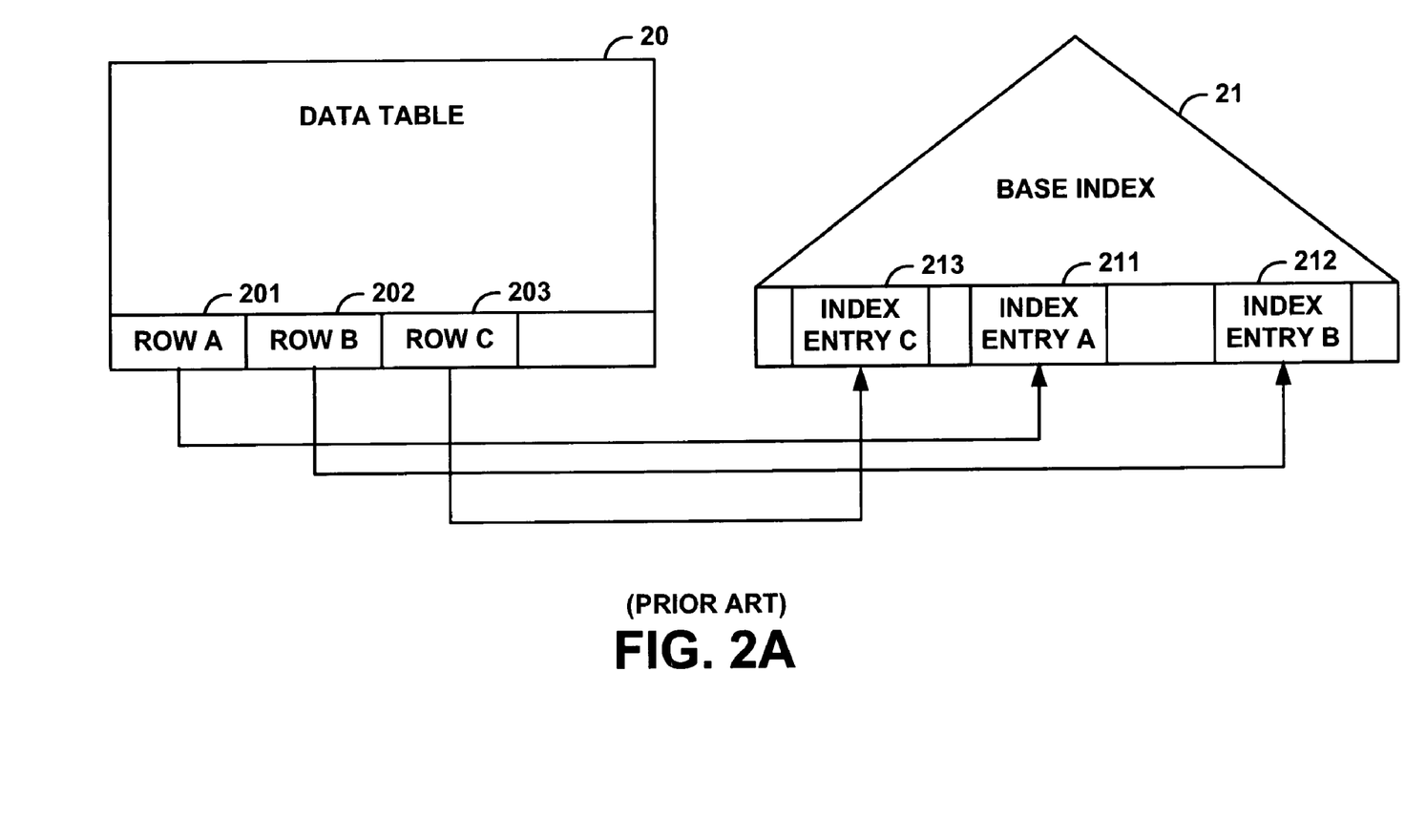
Figure 2B:
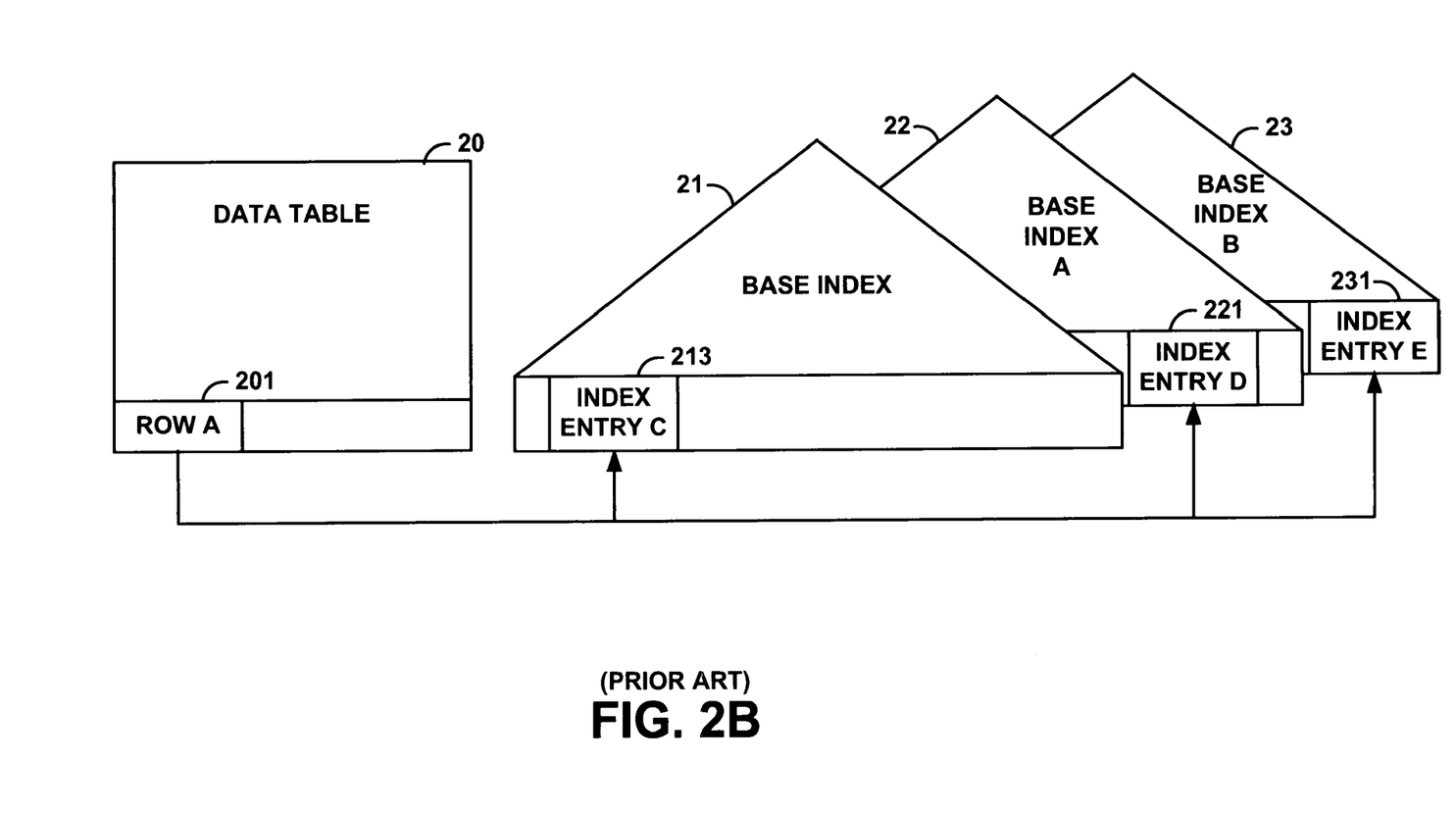

The database structure is illustrated in FIG. 2 (FIGS. 2A, 2B). There are shown a database table 20 where new data is entered as inserted database table rows such as, for example, row A, 201, row B, 202, and row C, 203, (collectively referenced as rows 201, 202, 203) with information of various categories arranged in columns. A base index 21 of the database table 20 is organized as a tree.

For each of the inserted rows 201, 202, 203, the base index 21 requires updating. An index update comprises adding an index entry such as, for example, an index entry A, 211, an index entry B, 212, an index entry C, 213, (collectively referenced as entries 211, 212, 213) pointing to the respective rows 201, 202, 203. Entries 211, 212, 213 are added into the base index 21 at an appropriate position determined by the index tree structure and the index key value. Only in the case of ever increasing key values, the inserted index entries are added at the end of the index resulting in no or few reads from the storage media. However, in general, an index entry requires insertion in a random fashion. Consequently, a large probability exists that the target index page is not in the database cache, resulting in a synchronous read from the storage media and, thus, a slow-down of the indexing process.

In FIG. 2A, only one index 21 is illustrated. Usually, there are a multitude of further indexes indexing the database table 20 depending on different criteria. FIG. 2B illustrates indexes such as, for example, the base index 21, a base index A, 22, and a base index B, 23 (collectively referenced as indexes 21, 22, 23). The indexes 21, 22, 23, each index the database table 20 according to a different column. Each of the indexes 21, 22, 23 requires updating if a row insert occurs.

If the conventional database management system 1 is implemented as a parallel database, i.e. a group of database systems managing the same data, the indexes require maintenance by all involved systems, adding an additional overhead due to contention of the indexes.

For each additional index there is an additional synchronous read, implying a large read wait time that results in overall insert performance degradation. Indexing is a performance booster for query processing and is further a choice for tuning query performance. The queries run in parallel with insert processing, so the indexes are required to exist all the time to provide access to the data.

In a special mode of operation, completion of massive insert processing is required in a given time interval. Furthermore, critical query processing must run concurrently on the same data, including newly inserted rows, with best possible performance. This is a common case because many applications include massive insert processing, usually concentrated at some period-closing times: end of the day, week, month, year, etc. These processes regularly require completion in a given time window, as subsequent business operations depend on the results of the processes. As the insert processing runs, the queries accessing the same data require good performance. For that good performance, the queries require access to the very indexes that are being updated and causing slow down of the insert operations.

Figure 3:
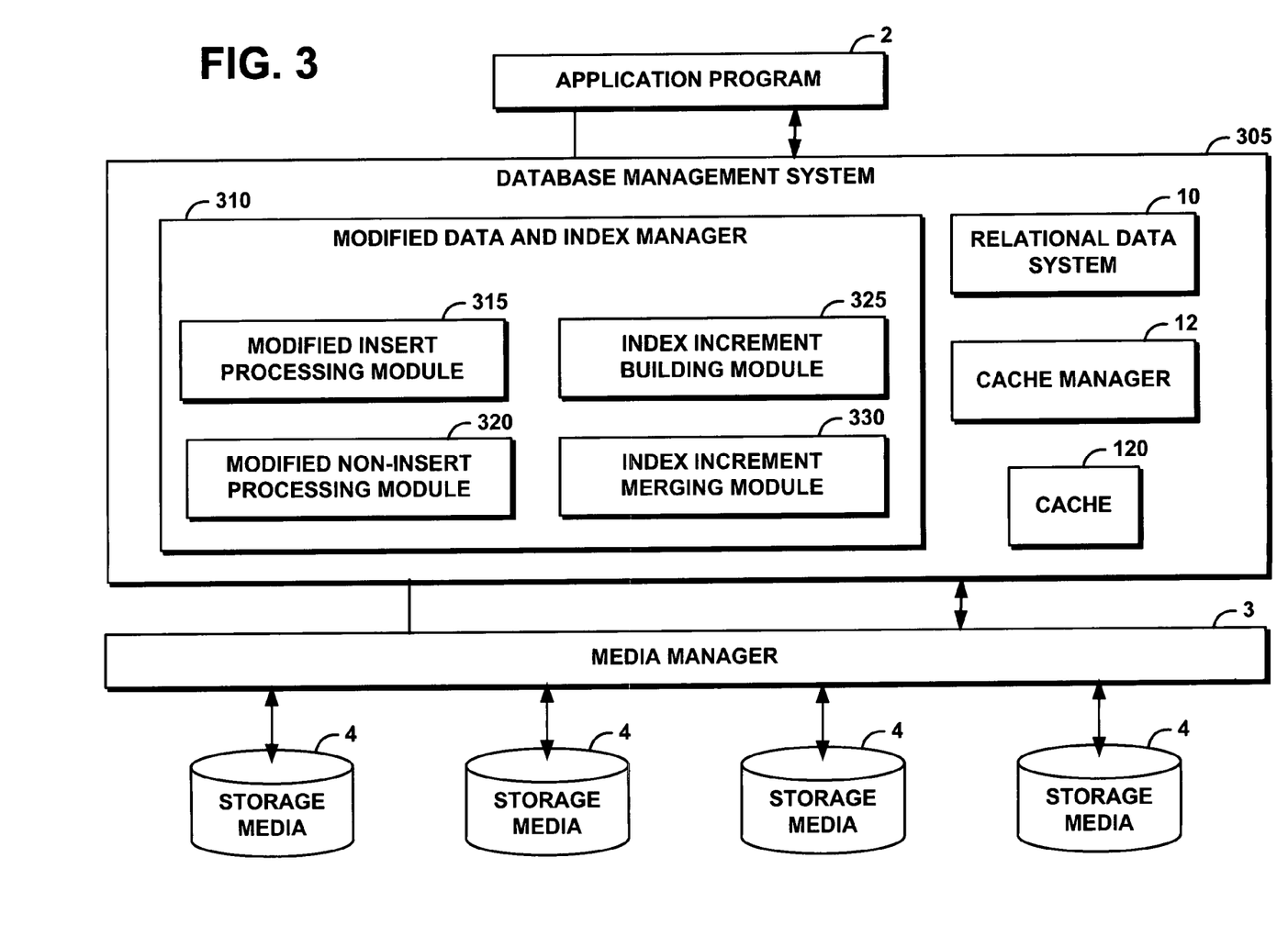
FIG. 3 schematically illustrates indexing according to the present invention.

An embodiment of the database management system according to the invention, a database management system 305, is schematically illustrated in FIG. 3. The database management system 305 may be implemented, for example, as computer with an appropriate computer program product running on it. The computer may be a stand-alone device or be a member of a network with servers and clients. The database management system 305 comprises a modified data and index manager 310. The modified data and index manager 310 comprises a modified insert processing module 315 and a modified non-insert processing module 320. The modified data and index manager 310 further comprises an index increment building module 325 and an index increment merging module 330. The insert processing module 315 and the non-insert processing module 320 are modified to efficiently cooperate with the index increment building module 325 and the index increment merging module 330.

The insert processing of the modified data and index manager 310 is enhanced to insert index entries into an index increment rather than a base index. For non-insert operations, such as SQL queries, the modified data and index manager 310 accesses index entries from the base index and from the index increments.

The index increment building module 325 generates one or more index increments for inserting index entries corresponding to data rows being inserted into a database table. The index increment merging module 330 merges the one or more index increments with the one or more base indexes after the new data rows have been inserted. The index increment building module 325 and the index increment merging module 330 may be, for example, implemented as computer program product comprising computer programming code adapted to perform these tasks. The index increment building module 325 and the index increment merging module 330 comprise a software programming code or a computer program product that is typically embedded within, or installed on a computer. Alternatively, the index increment building module 325 and the index increment merging module 330 can be saved on a suitable storage medium such as a diskette, a CD, a hard drive, or like devices.

The modified insert processing module 315 inserts index entries into an index increment rather than in a base index, if an index increment exists. The non-insert processing module 320 looks up data one or more base indexes and in one or more index increments to process queries or delete data.

FIG. 4 (FIGS. 4A, 4B, 4C, 4D) schematically illustrates the indexing process according to the modified data and index manager 310. Once a pattern of massive inserts is detected, a new index tree, i.e. an index increment 45 is spawned for a base index 41 that exists on a database table 40 (see FIG. 4A). With incremental indexing provided by the modified data and index manager 310, each database system can maintain its "own" index increments for each non-partitioning index. This isolation is complete, thus resulting in drastic reduction of cost of sharing data.

Figure 4A:
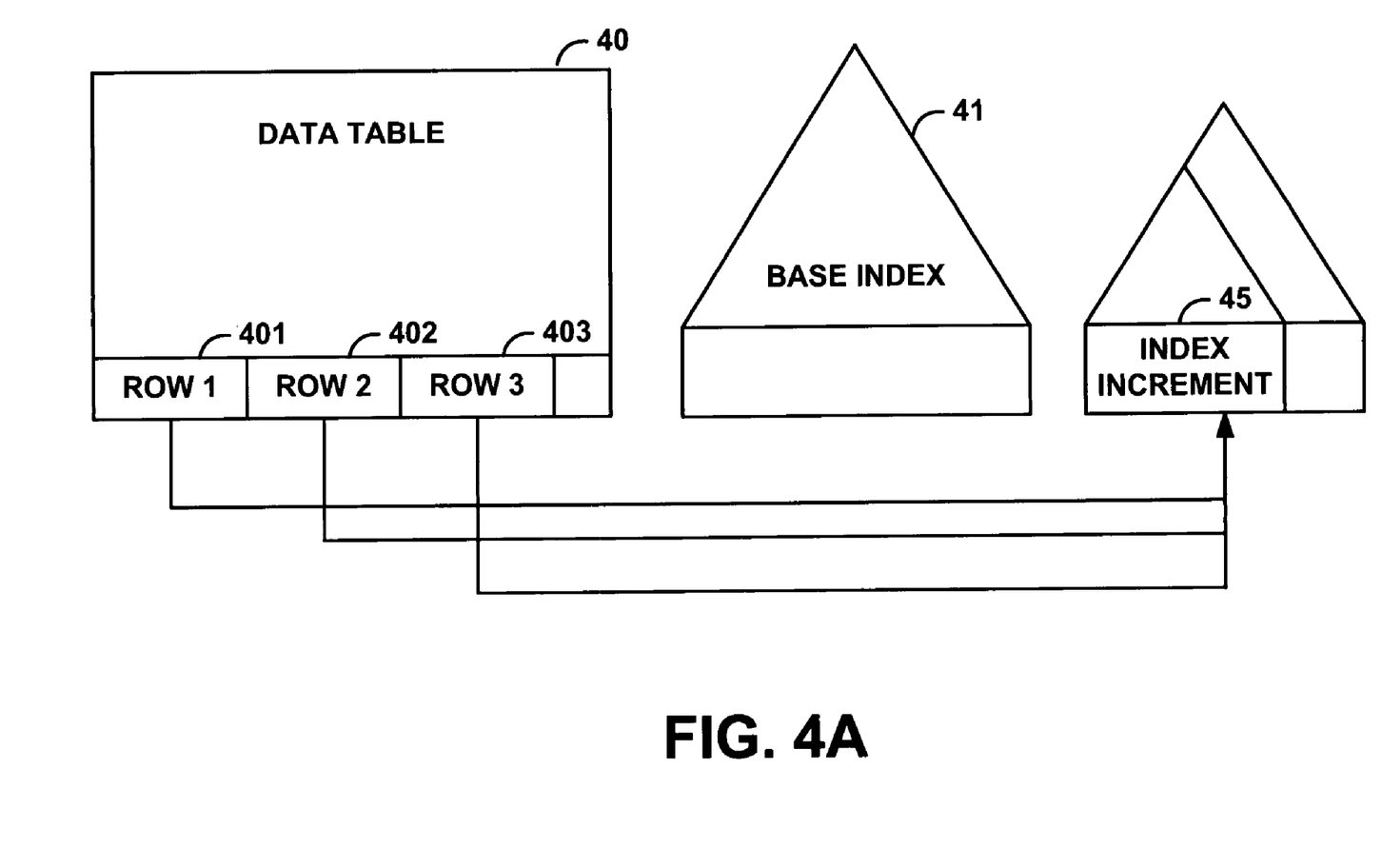

The data table 40 is illustrated with new data rows such as, for example, a row 1, 401, a row 2, 402, and a row 3, 403 (collectively referenced as rows 401, 402, 403). By using the index increment 45 for indexing the newly inserted rows 401, 402, 403, a much smaller index tree requires updating. Updating starts with a single page only (equivalent of one physical block of storage space) and grows with new inserts. The likelihood of target index pages being cached is much higher than in the case of updating a large monolithic base index.

Figure 4B:
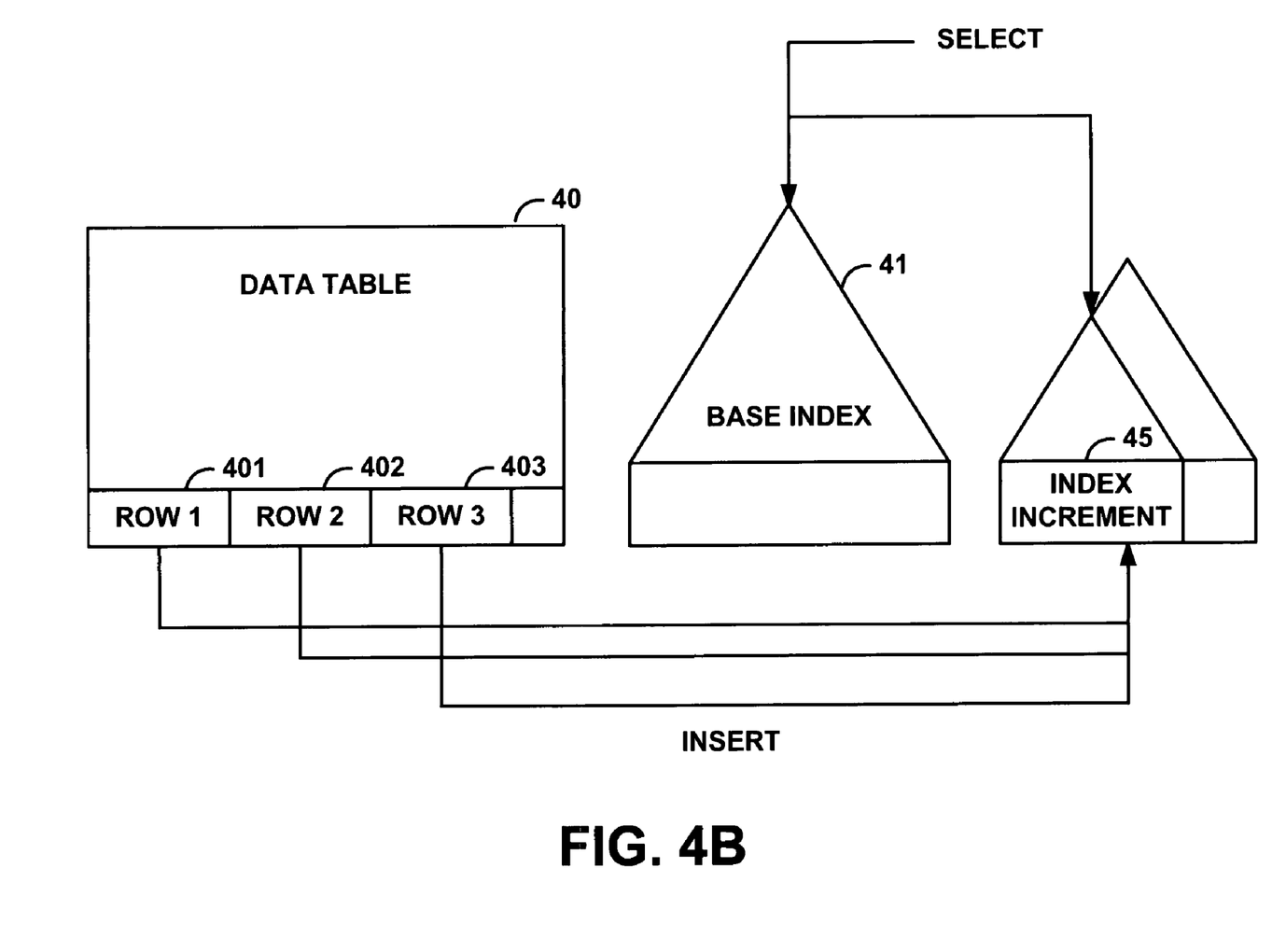

FIG. 4B illustrates how a query is processed during incremental indexing or before the index increment 45 has been merged with the base index 41. The query processing, in the present example "select", takes into account that a chosen index is not necessarily monolithic, but could have one or more increments. Thus, the base index 41 and the index increment 45 are scanned for the rows to be selected. In general, scanning the base index 41 and the index increment 45 increase in the cost of index scan can be minimized if parallel index scan is implemented. This increase in cost is offset many times by superior insert performance. The scan of the active index increment 45, i.e. the index increment 45 being inserted at the time, is likely to complete without any read from the storage medium, as the concerned pages are likely cached.

The index increment 45 is merged with the base index 41 after insertion of one or more rows 401, 402, 403. The actual time for merging can be determined automatically or merging can explicitly started by a user. The merging time is selected to minimize impeding other processes such as, for example, queries.

Figure 4C:
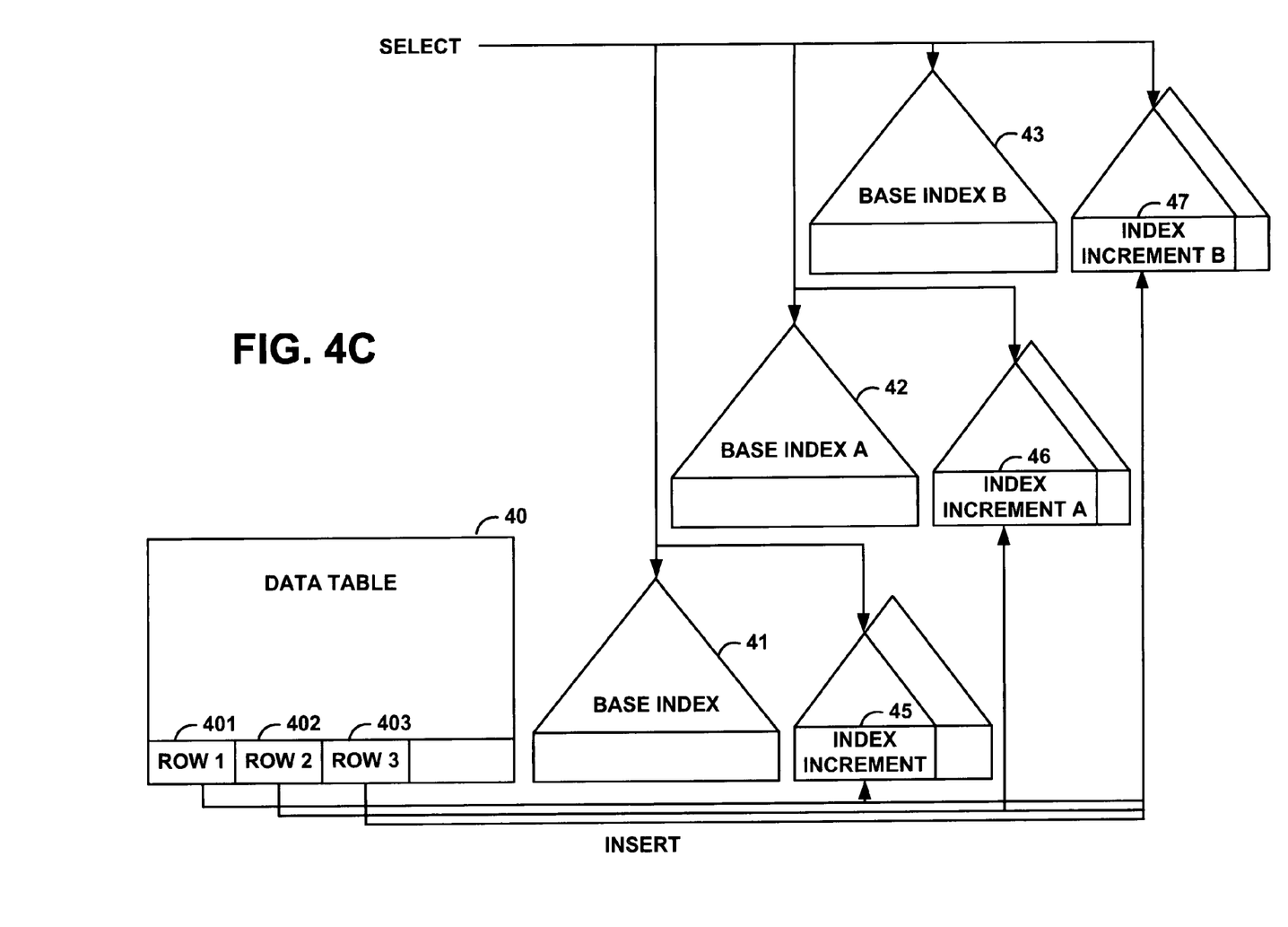

As illustrated in FIG. 4C, incremental indexing can be adapted to additional base indexes such as, for example, the base index 41, a base index A, 42, and a base index B, 43 (collectively referenced as base indexes 41, 42, 43). Each of the base indexes 41, 42, 43, index the database table 40 according to different criteria. As illustrated in FIG. 4C, an incremental index such as, for example, the index increment 45, an index increment A, 46, and an index increment B, 47 (collectively referenced as index increments 45, 46, 47) is generated for each of the base indexes 41, 42, 43, when rows 401, 402, 403 are inserted. Accordingly, if a query is to be processed, for example "select", the base indexes 41, 42, 43 and associated index increments 45, 46, 47 are scanned.

Figure 4D:
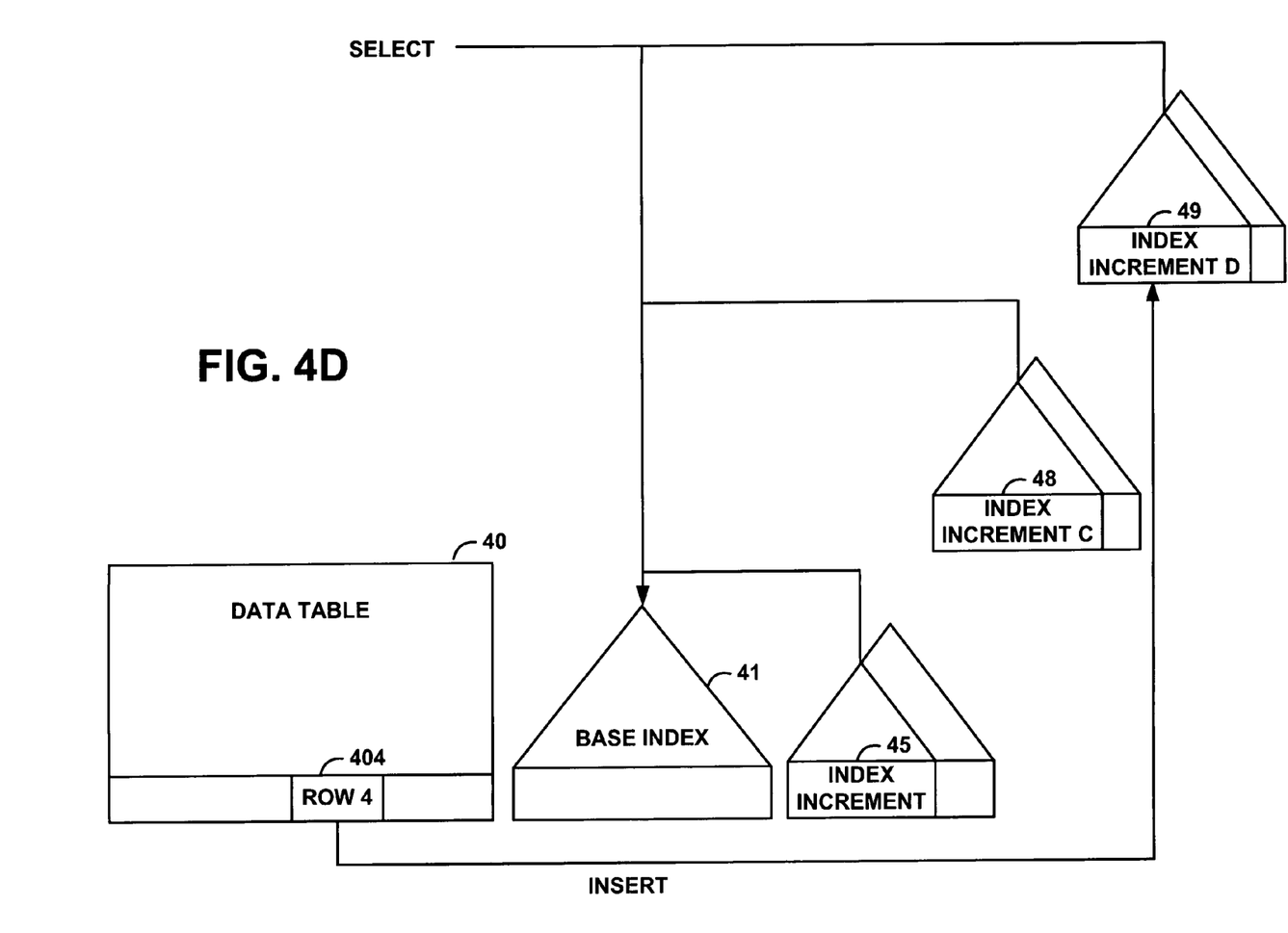

As illustrated in FIG. 4D, one or more index increments such as, for example, the index increment 45, an index increment C, 48, and an index increment D, 49 (collectively referenced as index increments 45, 48, 49) are provided per base index such as the base index 41. For example, inserting may occur in several batches before merging. Consequently, separate index increments 45, 48, 49, can be generated for each batch. If separate index increments 45, 48, 49, are generated, an index increment too large to be memory-resident or cache-resident is avoided. In the example illustrated in FIG. 4D, prior inserts to the database table 40 are indexed in the index increment 45 and the index increment C, 48. A present insert of row 404 is indexed in an active index increment represented as the index increment D, 49.

The concept of more than one index increment can be adapted to additional indexes. Index increments such as the index increment 45 and the index increment C, 48, can be merged with the base index 41 while the index increment D, 49 is active.

Figure 5:
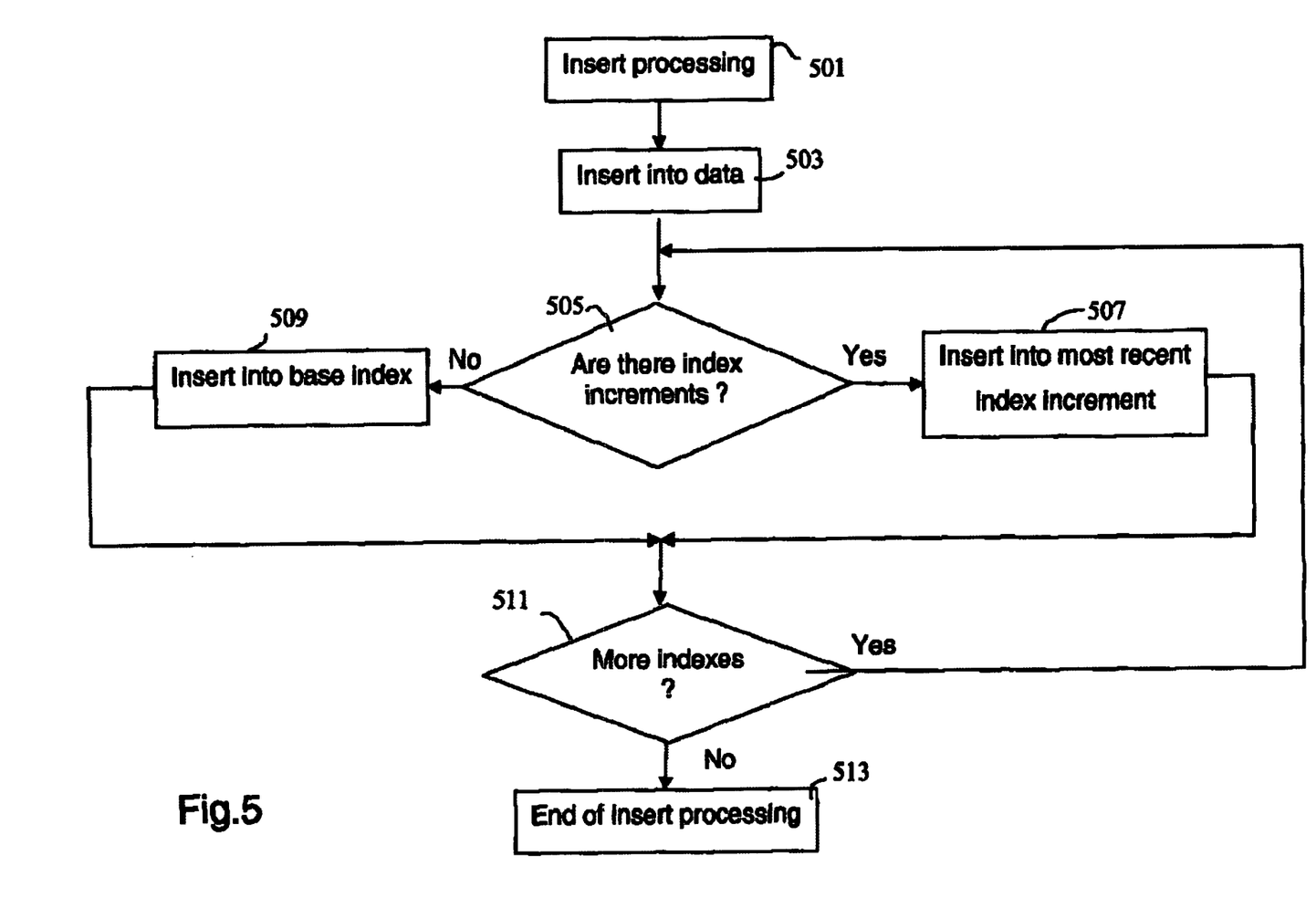
FIG. 5 is a process flowchart illustrating a method for insert processing.

FIG. 5 illustrates a flowchart illustrating insert processing (step 501). A new row is inserted into a database table (step 503). For updating the base indexes, the modified insert processing module determines, for each base index (step 511), whether there are any index increments (step 505). If index increments exists, the index entry is inserted into the most recent index increment associated with the base index (step 507). Otherwise, the index entry in inserted into the base index (step 509). If now additional base indexes remain for processing (step 511), insert processing ends (step 513).

Figure 6:
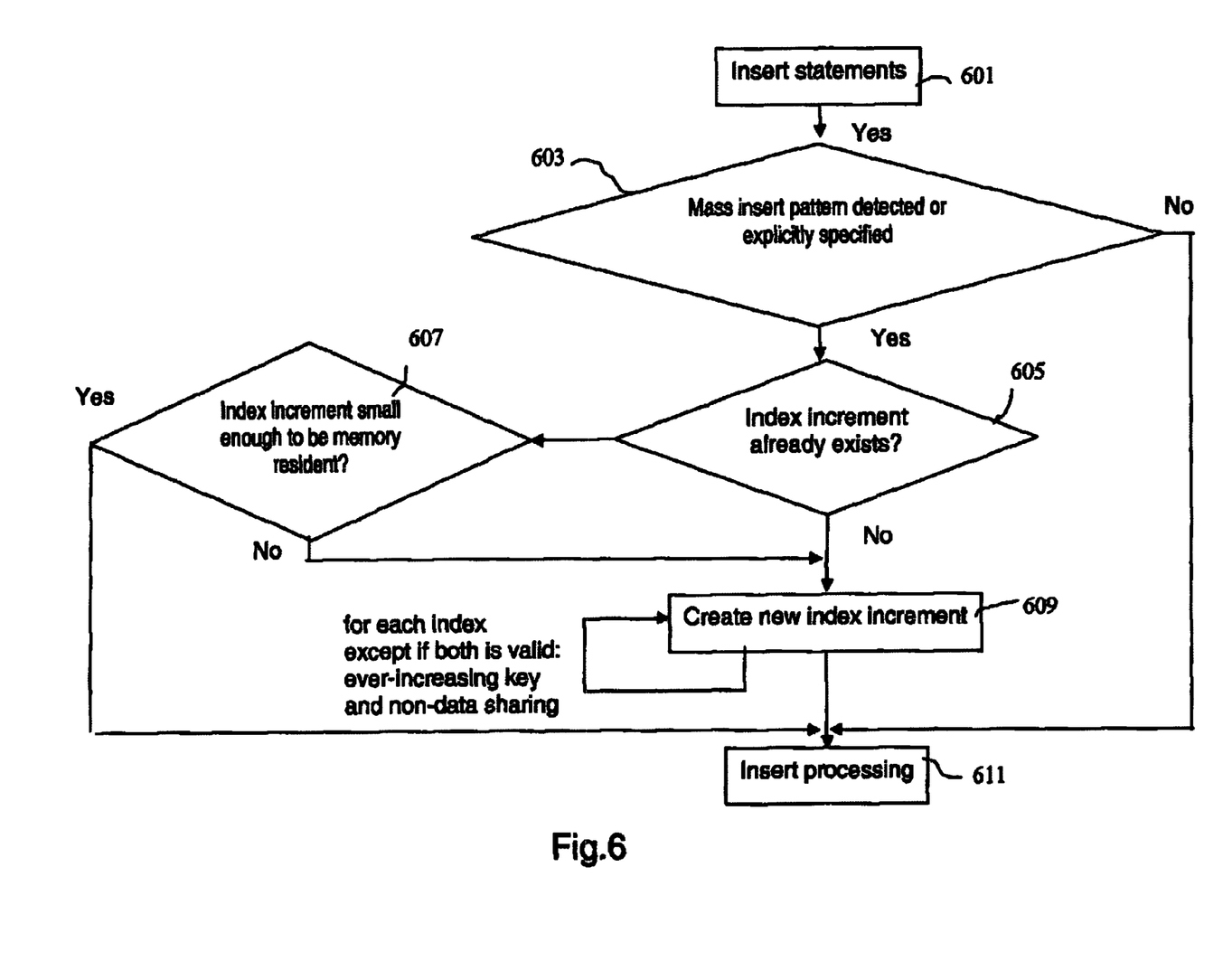
FIG. 6 is a process flowchart illustrating a method for building incremental indexes.

FIG. 6 illustrates a flowchart illustrating the process of building index increments as response to an insert statement (step 601). If a mass insert pattern is explicitly specified (e.g., by a setting on a specific session variable), or automatically detected (e.g., by monitoring the insert rate over a specified time interval) (step 603), the possibility of generating an index increment is considered. The index increment is not generated if one or more index increments already exist (step 605) or if the most recent index increment is small enough to be memory or cache resident (step 607). Otherwise, the index increment building module 325 creates a new index increment (step 609). This process is repeated for every index except for ever-increasing key indexes in non-data sharing environments (see step 609). After generating an index increment, the insert processing as explained in FIG. 5 is continued (step 611).

Figure 7:
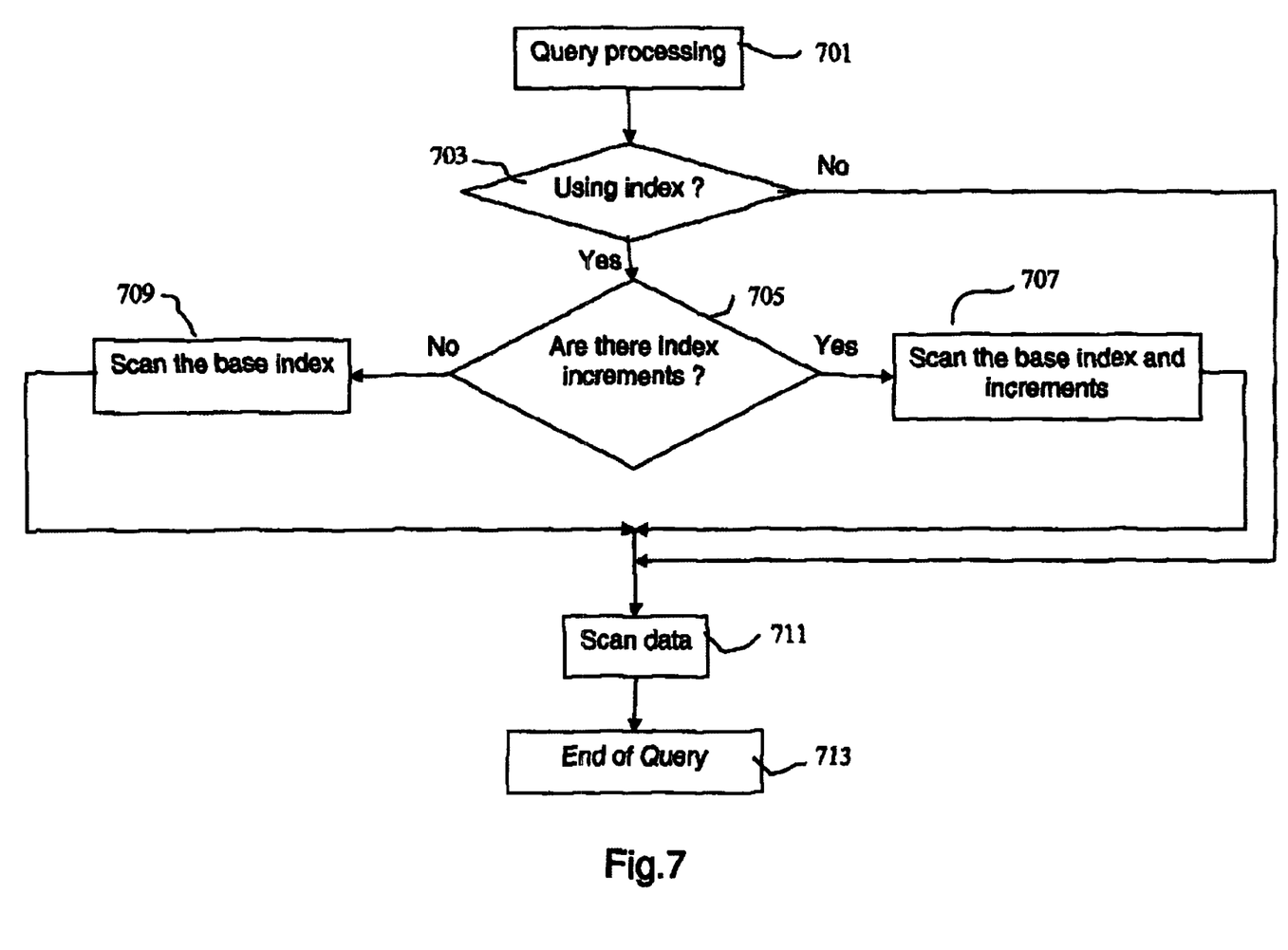
FIG. 7 is a process flowchart illustrating a method for query processing.

FIG. 7 illustrates a flowchart illustrating a process of the modified non-insert processing module 320 with reference to the example of a query. In processing a query (step 701), the modified non-insert processing module 320 determines whether an index is to be used (step 703). Whenever the query uses an index to access the data, the modified non-insert processing module 320 determines whether there are index increments for each of the indexes (step 705). If there are index increments, the base indexes and the index increments are scanned (step 707). Scanning can be performed serially or in parallel. If there are no index increments, only the base indexes are scanned (step 709). Depending on the result of the index scans, the data is scanned and retrieved (step 711) and returned to the application program 2, thus ending the query (step 713).

The query process takes into account that a chosen index is not necessarily monolithic, but may have one or more increments. In general, this will increase the cost of index scan, which can be minimized if parallel index scan is implemented. However the cost of the index scan is offset many times by superior insert performance. The scan of the active index scan, i.e. the one being updated at the time, is likely to complete without any read from the storage media, because these pages are likely cached.

Figure 8:
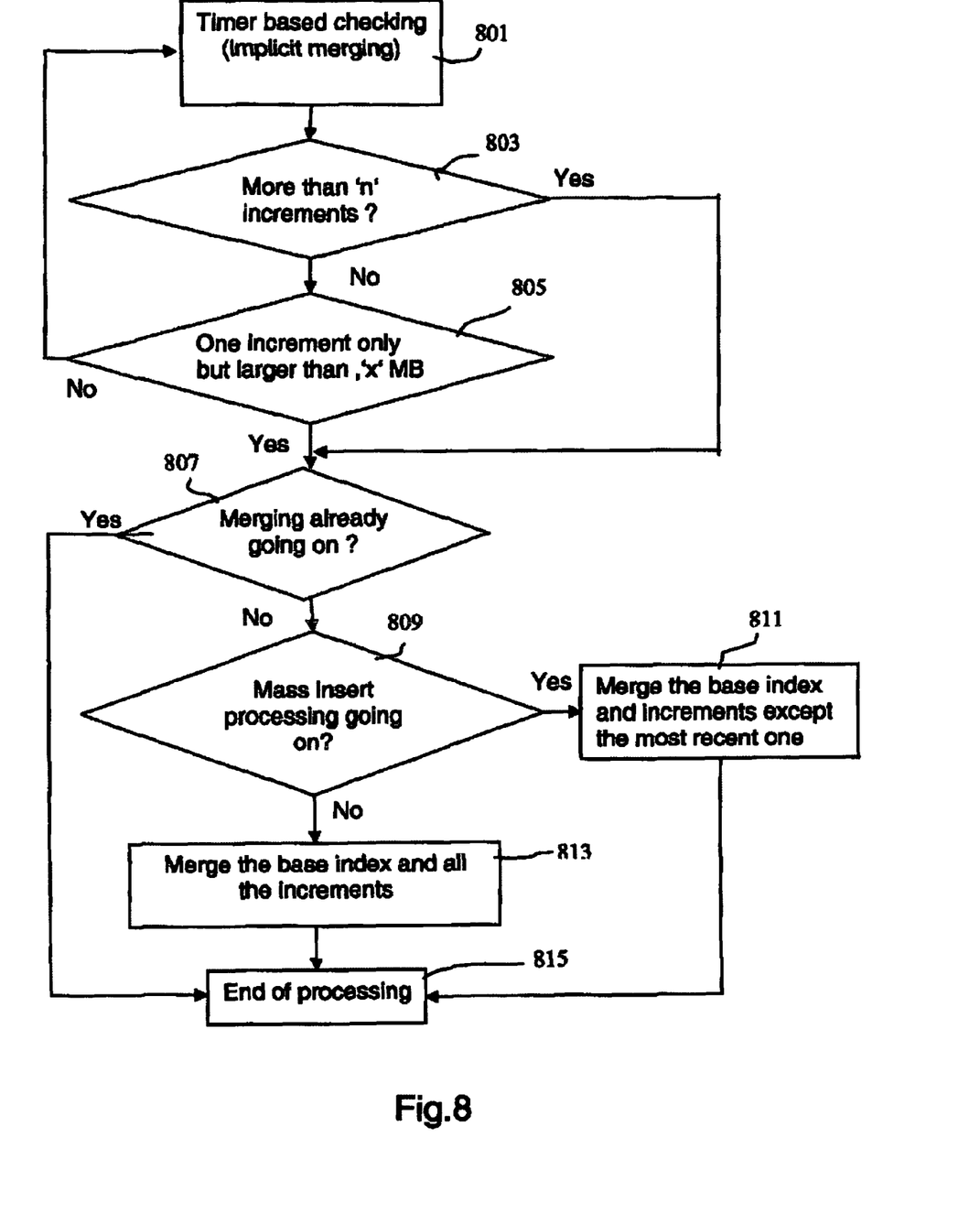
FIG. 8 is a process flowchart illustrating a method for implicit merging of incremental indexes.
Figure 9:
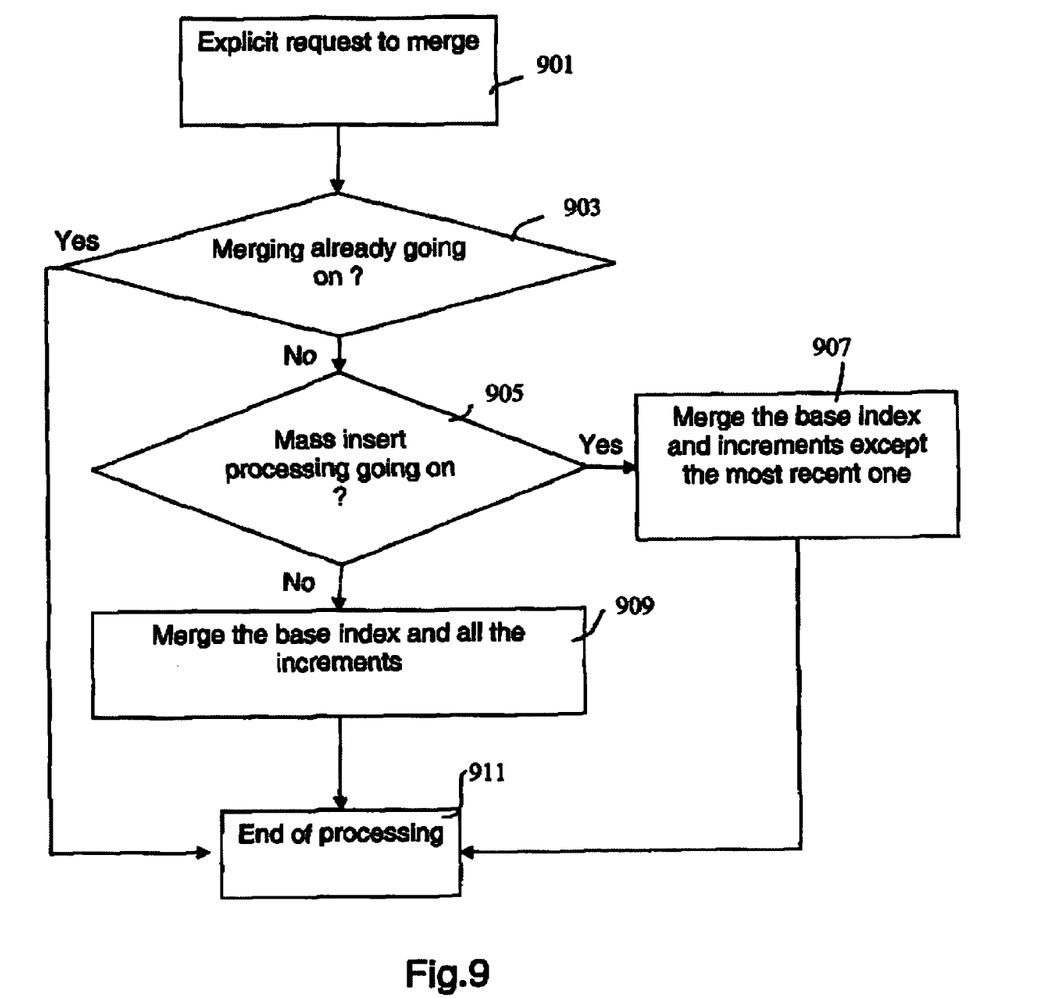
FIG. 9 is a process flowchart illustrating a method for explicit merging of incremental indexes.

FIGS. 8 and 9 illustrate flowcharts illustrating the merging of index increments with the base index. As illustrated in FIG. 8, the merge can be initiated implicitly (step 801), for example by a system agent that runs in the background and checks for some criteria indicating that merging is due. A possible criterion is, for example, the number of index increments (step 803) or a size of the index increments (step 805). Possible criteria further comprise an overall query response time or any other indicator.

As illustrated in FIG. 9, the merge can as well be initiated explicitly on administrator request (step 901).

Once the merge has been initiated, a check whether the merge process is already going on is performed (steps 807, 903). If yes, an appropriate message will be returned and no further action will be performed (steps 815, 911). If no, a check whether mass insert processing is currently running is performed (steps 809, 905). As merging during that process can be disruptive, the base indexes and the index increments excluding a most recent index increment are merged (steps 811, 907). If there is no mass insert processing occurring, the base index is merged with all index increments to create a new base index (steps 813, 909).

The step of merging may be performed according to any method known to a person skilled in the art, such as reorganization or rebuilding. To simplify processing and improve query performance, the merging process occurs before a next mass insert process to avoid creating more than one index increment per base index.

The methods of the modified data and index manager 310, as described with reference to FIGS. 5 to 9, may be readily modified to account for multiple indexes.

It is to be understood that the specific embodiments of the invention that have been described are merely illustrative of certain applications of the principle of the present invention. Numerous modifications may be made to the present invention described herein without departing from the spirit and scope of the present invention.

What is claimed is:

1. A computer-implemented method of indexing a plurality of entries in a database stored on a computer readable storage medium that contains a database table having a base index, the method comprising:
   inserting a plurality of rows in the database table;
   generating a plurality of index increments in response to insertion of the rows in the database table, the index increments comprising a subset of database index entries, each database index entry formatted to match a database index entry in a corresponding base index, wherein a number of database index entries in the index increments is less than a number of database index entries in the base index;
   adding a plurality of database index entries associated with the inserted rows to the index increments;
   generating an additional index increment from the plurality of index increments in response to an index increment having a memory size that approaches a memory size of volatile cache available to a database generating the additional index increment;
   satisfying a database request by performing a parallel index scan of the base index and the index increments, the parallel index scan scanning the base index and the index increments concurrently, the database request received subsequent to insertion of the row; and
   merging the index increments with the base index in response to a query response time for the database exceeding a first predefined criterion defined by an administrator of the database table and a number of index entries exceeding a second predefined criterion upon completion of the step of adding the plurality of index entries to the index increments, such that database index entries added to the base index satisfy a predefined ordering of the base index.

2. The method according to claim 1, wherein inserting the row comprises inserting a plurality of rows in the database table;
   wherein adding the index entry comprises adding a plurality of index entries associated with the inserted rows, to the index increment; and
   wherein merging the index increment occurs in response to the number of index entries exceeding a predefined criterion upon completion of the step of adding the plurality of index entries to the index increment.

3. The method according to claim 1, wherein the database comprises an additional base index, further comprising
   generating an additional index increment corresponding to the additional base index; and
   merging the additional index increment with the additional base index.

4. The method according to claim 1, wherein a database system manages the database and wherein the merging of at least one of the plurality of index increments is postponed in response to a determination that the database system is currently performing insert processing.

5. A database management system for indexing a plurality of entries in a database stored on a computer readable storage medium that contains a database table having a base index, the system comprising:
   a computer;
   a computer readable storage medium for storing data, in communication with the computer;
   a memory in communication with the computer, the memory comprising:
      the database table storing a plurality of newly inserted rows;
      an index increment building module for generating a plurality of index increments in response to insertion of the rows in the database table, the index increments comprising a subset of database index entries, each database index entry formatted to match a database index entry in a corresponding base index, wherein a memory size of the base index is greater than a memory size of volatile cache available to the database generating the index increments, an index increment based on the inserted rows, wherein the index increments are smaller than the base index;
      the index increment building module further adding a plurality of database index entries associated with the inserted rows to the index increments;
      the index increment building module further generating an additional index increment from the plurality of index increments in response to an index increment having a memory size that approaches the memory size of volatile cache available to the database generating the index increment;

satisfying a database request by performing a parallel index scan of the base index and the index increments, the parallel index scan scanning the base index and the index increments concurrently, the database request received subsequent to insertion of the row; and an index increment merging module for merging the index increments with the base index in response to a query response time for the database exceeding a first predefined criterion defined by an administrator of the database table and a number of index entries exceeding a second predefined criterion upon completion of the step of adding the plurality of index entries to the index increments, such that database index entries added to the base index satisfy a predefined ordering of the base index.

6. The database management system according to claim 5, wherein the database table stores a plurality of inserted rows;

wherein the index increment building module adds a plurality of index entries associated with the inserted rows, to the index increment; and wherein the index increment merging module merges the index increment upon adding the plurality of index entries to the index increment.

7. The database management system according to claim 6, wherein the database comprises an additional base index;

wherein the index increment building module generates an additional index increment corresponding to the additional base index; and wherein the index increment merging module merges the additional index increment with the additional base index.

8. A computer program product stored in a computer readable storage medium, the computer program product having a plurality of program codes for indexing a plurality of entries in a database that contains a database table having a base index, the computer program product comprising:

the database table storing a plurality of newly inserted rows;

a program code for generating a plurality of index increments, in response to insertion of the rows in the database table, the index increments comprising a subset of database index entries, each database index entry formatted to match a database index entry in a corresponding base index, wherein a memory size of the base index is greater than a memory size of volatile cache available to the database generating the index increments;

a program code for adding a plurality of database index entries associated with the inserted rows to the index increments;

a program code for generating an additional index increment from the plurality of index increments in response to an index increment having a memory size that approaches the memory size of volatile cache available to the database generating the index increments;

satisfying a database request by performing a parallel index scan of the base index and the index increments, the parallel index scan scanning the base index and the index increments concurrently, the database request received subsequent to insertion of the row; and a program code for merging the index increments with the base index in response to a query response time for the database exceeding a first predefined criterion defined by an administrator of the database table and a number of index entries exceeding a second predefined criterion upon completion of the step of adding the plurality of index entries to the index increments, the merging performed during off-peak hours, such that database index entries added to the base index satisfy a predefined ordering of the base index.

9. The computer program product according to claim 8, wherein the database comprises an additional base index;

wherein the program code for generating the index increment generates an additional index increment corresponding to additional base index; and wherein the program code for adding the index entry merges the additional index increment with the additional base index.

\* \* \* \* \*